United States Patent
Wolf et al.

(10) Patent No.: US 6,816,818 B2
(45) Date of Patent: Nov. 9, 2004

(54) METHOD, CLOCK GENERATOR MODULE AND RECEIVER MODULE FOR SYNCHRONIZING A RECEIVER MODULE

(75) Inventors: Michael Joachim Wolf, Mundelsheim (DE); Werner Beisel, Ludwigsburg (DE); Jürgen Höhn, Abstatt (DE)

(73) Assignee: Alcatel, Paris (FR)

( * ) Notice: Subject to any disclaimer, the term of this patent is extended or adjusted under 35 U.S.C. 154(b) by 185 days.

(21) Appl. No.: 10/024,025

(22) Filed: Dec. 21, 2001

(65) Prior Publication Data

US 2002/0082790 A1 Jun. 27, 2002

(30) Foreign Application Priority Data

Dec. 23, 2000 (DE) .......................................... 100 64 928

(51) Int. Cl.⁷ .......................... G06F 11/00; G06F 15/00
(52) U.S. Cl. ........................ 702/188; 709/203; 307/42; 370/386
(58) Field of Search ........................ 702/188; 709/203; 307/42; 370/386

(56) References Cited

U.S. PATENT DOCUMENTS

2003/0126195 A1 * 7/2003 Reynolds et al. ........... 709/203

* cited by examiner

Primary Examiner—John Barlow
Assistant Examiner—Aditya Bhat
(74) Attorney, Agent, or Firm—Sughrue Mion, PLLC (57) ABSTRACT

A method of synchronizing at least one receiver module (MOD 1, MOD2), in particular a receiver module in a telecommunications network or in a network device of a telecommunications network, has the following steps: A first clock signal (TS 1) and a second clock signal (TS2) are sent to the at least one receiver module (MOD 1, MOD2). In addition, at least one item of master-slave-status information (MSX) about the at least one first clock signal (TS1) and/or the second clock signal (TS2) is sent to the at least one receiver module (MOD1, MOD2). Based on the item of master-slave-status information (MSX), the at least one receiver module (MOD 1, MOD2) selects the first clock signal (TS 1) or the second clock signal (TS2) as master synchronization signal for its synchronization.

42 Claims, 2 Drawing Sheets

METHOD, CLOCK GENERATOR MODULE AND RECEIVER MODULE FOR SYNCHRONIZING A RECEIVER MODULE

The invention is based on a priority application DE 10064928.9, which is incorporated by reference herein.

FIELD OF THE INVENTION

The present invention relates to the field of telecommunications and computer technology and more particularly to a method of synchronizing at least one receiver module, a synchronizable receiver module therefor, and a clock generator module therefor.

BACKGROUND OF THE INVENTION

In the telecommunications and computer technology sectors, the assemblies required for the operation of a device often cannot be arranged on one electronic board but must be distributed between a plurality of separate modules on one or more respective boards. In particular in telecommunications systems, redundant modules are also used as a safeguard against failure. For the modules to operate synchronously, the receiver modules receive a central clock signal which in the simplest case is only one clock pulse.

A central clock signal of this kind is generated for example by a central clock generator module and transmitted to the receiver modules. A clock channel of a bus to which the receiver modules are connected is provided for example for the transmission. The receiver modules then operate either directly with the clock signal tapped from the bus or for example synchronize their own local clock generator, provided on the respective receiver module, with the central clock signal.

In a consequently redundant system, a receiver module is however supplied not only with one clock signal but with at least one second clock signal, in which case the connected receiver modules select one of the clock signals as master synchronization signal for their synchronization and the other clock signal(s) serve as slave synchronization signals which are selected as clock signal(s) upon the failure of the master synchronization signal. Ideally all the clock signals are synchronous, the slave clock signals being synchronized for example with the master clock signals so that the receiver modules to be synchronized in principle can select any one of the clock signals as their respective master synchronization signal without any phase difference.

However, in high-precision network devices of telecommunications networks operating at a high clock frequency, for example in so-called cross-connects in SDH transmission technology (SDH=synchronous digital hierarchy), even very small phase shifts between the individual clock signals have a disturbing influence on the precision of the network device. The modules of a network device, which for example are I/O assemblies (I/O=input/output) or switching matrices, then no longer operate sufficiently in synchronism and messages passing through the modules of the network device are subject for example to data overtaking or overlaps.

The same problems arise even if, for reasons of redundancy, network devices in a telecommunications network are synchronized with more than one clock signal.

SUMMARY OF THE INVENTION

Therefore the object of the invention is to provide a method and device for a precise synchronization of at least one receiver module, in particular a receiver module in a telecommunications network or in a network device of a telecommunications network.

This object is achieved by a method of synchronizing at least one receiver module, in particular a receiver module in a telecommunications network or in a network device of a telecommunications network, which has the following steps: A first clock signal and a second clock signal are sent to the at least one receiver module. In addition, at least one item of master-slave-status information about the at least one first clock signal and/or the second clock signal is sent to the at least one receiver module. Based on the item of master-slave-status information, the at least one receiver module selects the first clock signal or the second clock signal as master synchronization signal for its synchronization.

The invention is based on the principle that the respective receiver module, which is sent at least one first clock signal and a second clock signal, and selects the at least one first clock signal or the second clock signal as master synchronization signal for its synchronization, is sent, in addition to the clock signals, an item of master-slave-status information about the clock signals, on the basis of which information the receiver module can determine which of the clock signals is currently the master clock signal and which clock signal is the slave clock signal. The receiver module then selects the clock signal identified as master synchronization signal for its synchronization and thus synchronizes itself with the clock signal operating with a higher degree of precision.

The invention can be used advantageously in any system with redundant clock distribution. The system can consist of one single device or for example a communications network. In a particularly preferred embodiment the invention is used in a transmission network, in particular a transmission network with a synchronous digital hierarchy (SDH) or in a network device of the transmission network, for example in a cross-connect of a SDH transmission network, a SONET network device (SONET=synchronous optical network) or a PDH network device (PDH=plesiosynchronous digital hierarchy). The receiver modules consist for example of input/output modules or switching matrix modules, which in all events require precise synchronization for smooth mutual cooperation.

Further advantageous developments of the invention are described in the dependent claims and in the description.

The master-slave-status information can in principle be sent to the receiver module(s) in addition to the respective clock signals as separate control information, for example on a separate data line.

The master-slave-status information can also be contained in the respective clock signals, at least partially so-to-speak as "in-band-identifier". Here different variants are conceivable. For example a master/slave identifier, for example in the form of one bit, could be attached to the clock signals. Moreover, only that clock signal to which a master identifier is added could be characterised as master synchronization signal, while clock signals with no identifier are automatically regarded as slave clock signals. Additionally, only the slave clock signals, not however the master clock signal, could be identified.

Advantageously, one of the clock signals is defined as a preferred master synchronization signal. If it is then undetectable, on the basis of the item of master-slave-status information, as to which of the clock signals is to be selected as the master synchronization signal, for example because the master-slave-status information is not sent or is sent faultily to the respective receiver module or the master-slave-status information identifies more than one clock signal as master synchronization signal, the receiver module selects the clock signal defined as preferred master synchronization signal. Faults relating to the. master-slave-status information thus hardly affect the precision of the synchronization.

The clock signals are preferably generated by one or more clock generator module(s). These can for example each have their own clock generator, for example comprising an oscillator, and/or can regenerate a clock received from the exterior and distribute this among the receiver modules which they are assigned. The latter applies for example to SDH cross-connects, in the case of which input/output modules receive external clock signals at so-called I/O ports (I/O=input/output) respectively assigned to transmission paths. The clock generator modules preferably select the I/O port with the best clock quality as clock source and from the clock information thereof generate the redundant clock signals intended for the receiver modules.

The clock signals distributed by the clock generator modules are preferably synchronous with one another. For this purpose at least one first (master) clock generator module, which for example normally generates the clock signal serving as master synchronization signal, sends a second (slave) clock generator module synchronization signal from which the second clock generator module can detect the correct function of the first clock generator module. The two clock generator modules are supplied with a base clock signal, for example by the same I/O port, and thus run in synchronism.

If the second (slave) clock generator module no longer receives the synchronization signal and consequently the first clock generator module no longer operates correctly, the second (slave) clock generator module becomes the (master) clock generator module and preferably the clock signal generated by the second clock generator module then becomes the master synchronization signal.

In principle however it is also possible for the synchronization signal sent from the first clock generator module to the second not only to comprise a pure "sign of life" but also to contain information for the sychronization of the second clock generator module. For example, the clock signal generated by the first clock generator module could be sent to the second clock generator module for the synchronization thereof.

The clock signals preferably are sent to the receiver module(s) on separate clock lines assigned to the respective clock signals, so that for reasons of redundancy the clock signals are substantially independent of one another and disturbances in one clock signal do not affect the respective other clock signal. In principle, the clock signals could also be transmitted on a common line, for example using a suitable modulation process.

If they are not anyhow contained in the respective clock signals, the items of master-slave-status information assigned to the relevant clock signals are likewise preferably transmitted to the receiver modules on separate lines.

Expediently the clock signals contain items of source information from which the source of the clock signal, for example the clock generator module generating the clock signal, is detectable. Clock generator modules designated "A" and "B" insert these designations as source information, for example "clock generator module A" and "clock generator module B", into the respective clock signals. If a receiver module now receives a clock signal with the identifier "clock generator module A" on a clock line assigned to the clock generator module "B", for example because a cable containing the clock line has been incorrectly plugged in, the receiver module can signal the error and optionally start an error management routine, for example internally change-over the clock lines assigned to the clock generator modules "A" and "B". In principle it is sufficient in the case of two clock signals for only one of these to contain such an item of source information. Furthermore, the source information could also be contained in an item of control information assigned to the clock signals. For example, in a cable provided for the transmission of a clock signal, one line could be provided for the clock signal and for the source information and/or master-slave-status information.

In a preferred variant, the receiver module(s) are sent at least one third clock signal with which the receiver module(s) can perform a fine synchronization. For example, the master-and-slave synchronization signals serving for basic synchronization can be transmitted at a bit rate particularly suitable for measurement purposes, for example 2 Mbit/s, while the clock signal(s) serving for the fine synchronization can be transmitted at a different, higher clock frequency, for example the 2.43 MHz frequency typically used in the case of SDH, which however cannot be measured or can be measured only with difficulty when conventional measuring instruments are used.

In a particularly preferred variant of the invention it is taken into account that phase differences can occur between the clock signals received by a receiver module. These phase differences can be caused for example by unsynchronized or inadequately synchronized clock generator modules or by propagation time differences because the clock signals are transmitted to a respective receiver module on lines of different length. However, in the receiver module(s) there are provided delay means assigned to the clock signals, for example shift registers which can be dynamically scanned by means of multiplexers, with which the respective receiver module can correct any phase differences present between the clock signal serving as master synchronization signal and the clock signal(s) serving as slave synchronization signals, so that the receiver module can at any time switch-over without a phase jump between the clock signals made available by the delay means. Here it is particularly advantageous for the receiver module to delay the first selected clock signal, for example the clock signal selected as master synchronization signal, by a predetermined delay time which preferably corresponds to a maximum expected propagation time difference between the master clock signal and the slave clock signal(s). If for example the cables used for the transmission of the clock signals have a length of between 0 metres and at the maximum 200 metres, a signal propagation time on a 200 metre cable is set for example as predetermined delay time. The unselected clock signal, for example the respective slave clock signal(s), is/are likewise firstly delayed by the predetermined delay time. Then, however, the delay of the unselected clock signal is adapted so that finally all the clock signals at the outputs of the delay means are at least approximately in-phase.

For example, a shift register assigned to the unselected clock signal is scanned in stepped fashion at different memory locations adjustable by a multiplexer and the respective (unselected) clock signal is extracted. Then the phase difference between selected (master) clock signal and unselected (slave) clock signal is determined and the scanning setting of the multiplexer is adapted in order to reduce the phase difference.

The receiver module adapts itself automatically however to different phase differences between the clock signals, so that the receiver module can switch over between these with no phase jump and continues to operate in the event of the failure of a clock signal. In this way, taking the previously described example, cables of an any length up to 200 meters can be used for the transmission of the clock signals.

Obviously, the receiver modules and/or clock generator modules suitable to execute the method according to the invention can also be implemented as software modules, the program code of which can be executed by a suitable control means, for example a digital signal processor.

BRIEF DESCRIPTION OF THE DRAWINGS

In the following the invention and the advantages thereof will be described in the form of an exemplary embodiment making reference to the drawing in which.

DETAILED DESCRIPTION OF THE INVENTION

Figure 1:
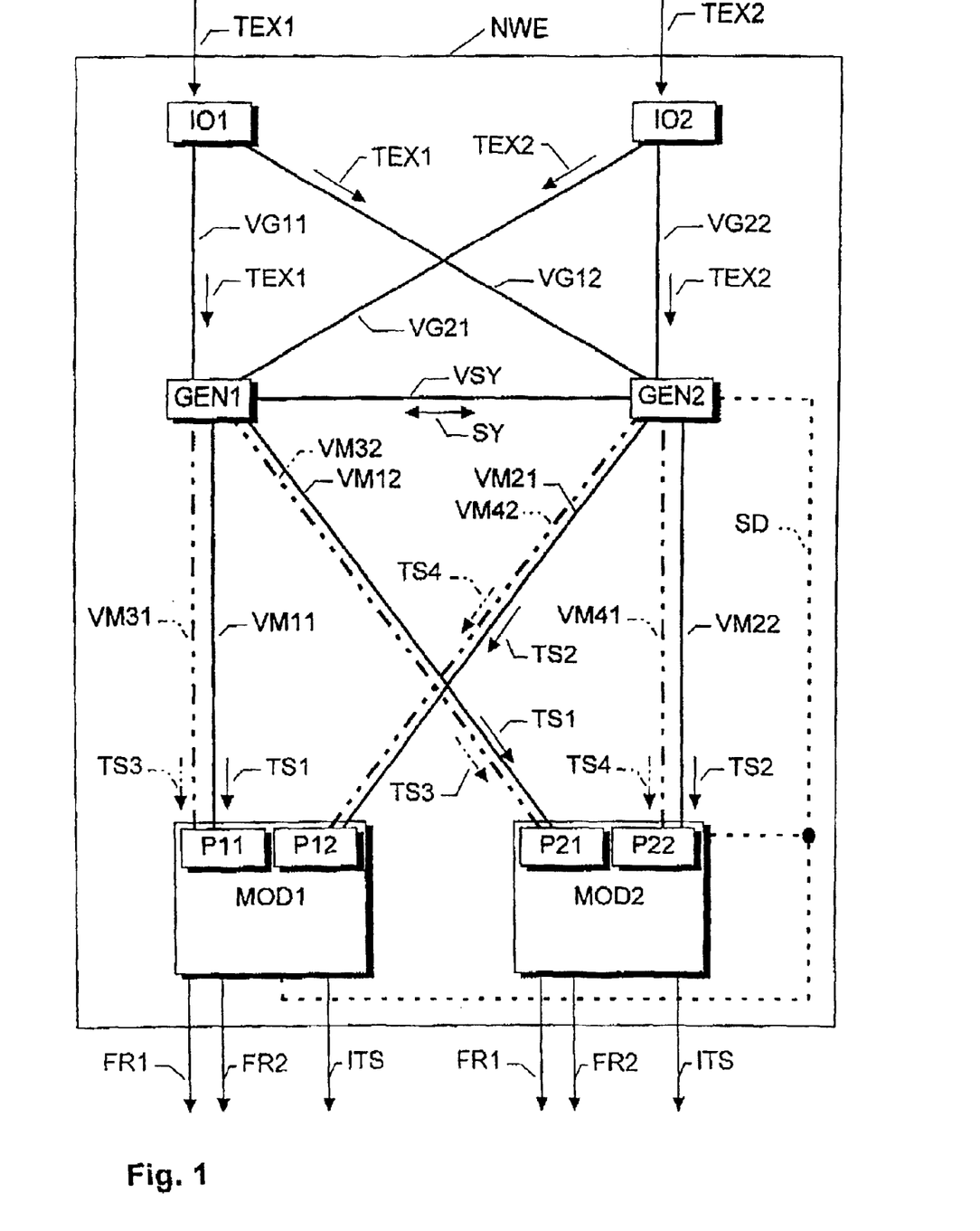
FIG. 1 illustrates an example of an arrangement for the execution of the method according to the invention with receiver modules MOD1, MOD2 according to the invention and clock generator modules GEN1, GEN2 according to the invention, which are contained in a network device NWE according to the invention.

A network device NWE contains receiver modules MOD1, MOD2 which are supplied with clock signals TS1, TS3 and TS2, TS4 respectively by clock generator modules GEN1, GEN2. Apart from a possible phase difference between them, the clock signals TS1, TS2 are redundant clock signals, from which the receiver modules MOD1, MOD2 select one signal as master synchronisation signal for their synchronisation. The clock signals TS3, TS4 are clock signals which are sent in addition to the clock signals TS1, TS2 and which serve for the fine synchronisation of the receiver modules MOD1, MOD2. In the present case the clock signals are likewise mutually redundant clock signals, from which the receiver modules MOD1, MOD2 select a clock signal TS3 or TS4.

The network device NWE is a network node of a transmission network, for example a cross-connect of a SDH transmission network. The network device NWE receives data, for example so-called SDH frames, by means of so-called I/O ports IO1, IO2 (I/O=input/output), serving as receiving means, of transmission paths (not shown here) provided for example on SDH transmission lines. The data, for example the SDH frames, on the one hand comprise payload data and on the other hand control data which for example are contained in their so-called overhead and in the present case contain (external) clock signals TEX1, TEX2. The clock signals TEX1, TEX2 can also be determined for example from the transmission rate and/or structure of the data received at the I/O ports IO1, IO2 or received on separate clock signal lines (not shown) from the network device NWE. The I/O ports IO1, IO2 consist of input/output modules implemented for example as integrated circuits which for example are arranged on an interface card.

The clock generator modules GEN1, GEN2 each have the form of separate electric assemblies, for example electric boards or integrated circuits. In the present case the clock generator modules GEN1, GEN2 have the form of mutually redundant clock generator modules and can be arranged for example on a central control console or control computer of the network device NWE or on a respective separate console. The clock generator modules GEN1, GEN2 can also have the form of program modules whose program code is executed for example by a respective processor of one or more control computer(s) of the network device NWE.

The receiver modules MOD1, MOD2 to be synchronized consist for example of input/output assemblies, switching matrices or stages thereof, or other modules which must operate in synchronism for the smooth operation of the network device NWE.

From the I/O port IO1, the (external) clock signal TEX1 is transmitted via connections VG11, VG12 to the clock generator modules GEN1, GEN2, and from the I/O port IO2 the clock signal TEX2 is transmitted via connections VG21, VG22 to the clock generator modules GEN1, GEN2. The clock generator modules GEN1, GEN2 select that one of the clock signals TEX1, TEX2 which has the best clock quality. The respective clock quality is contained for example as so-called "synchronization status message" (SSM) in SDH frames and can thus be detected by the I/O ports IO1, IO2 and/or the clock generator modules GEN1, GEN2.

According to the SDH standards of the ETSI (=European Telecommunications Standards Institute) the SSM can for example have the following meanings in descending order of quality: "primary reference clock", "transit node", "local node", "SDH equipment clock" and "do not use". With the "do not use" identifier, a SDH node operating as slave clock signals to a SDH node serving as clock source that it has currently selected its clock signal as reference and consequently a clock signal sent (back) by itself (=slave clock) to the SDH node operating as clock source cannot be used for its synchronization. The previously described and further synchronization status messages (SSMs) for SDH- and SONET transmission networks are standardized by the ITU (International Telecommunications Union).

By means of clock generating means which have not been shown, for example with so-called phase locked loops (PLL), from the clock signals TEX1, TEX2 serving so-to-speak as basic clock signals the clock generator modules GEN1, GEN2 on the one hand generate the clock signals TS1, TS2, which in the present case are so-called frame clock signals and are transmitted at a bit rate of 2,048 megabits per second, and also generate the clock signals TS3, TS4, which are simple clock signal pulses for the fine synchronization of the receiver modules MOD1, MOD2 and for example have a frequency of 2.43 Megahertz. Due to their commonplace frequency the frame clock signals TS1, TS2 can be analyzed using known, commercially available measuring instruments.

Figure 3:
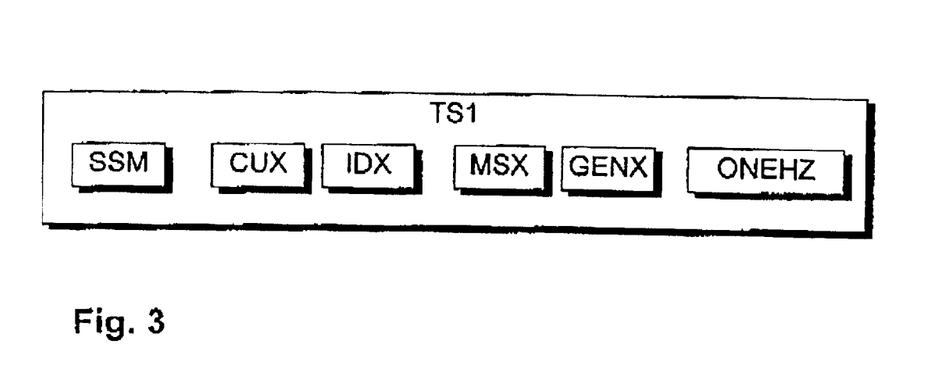
FIG. 3 illustrates a clock signal TS1 which is generated by the clock generator module GEN1.

The frame clock signals TS1 TS2 contain a plurality of base frames which are cyclically repeated, for example with a frequency of 8 Kilohertz (kHz), and which themselves serve as clock signals. The base frames, which for example are cyclically transmitted at 8 kHz, contain quality identifiers and further synchronization signals or frames, for example a 1 Hz clock signal ONEHZ. The 1 Hz clock signal ONEHZ can for example consist of one bit in the base frame which changes every 500 milliseconds between the values "0" and "1". The quality identifiers are for example individual bits or bit sequences and comprise the above explained SSM identifier sent from the I/O ports IO1, IO2 to the clock generator modules GEN1, GEN2, identifiers CUX, GENX, IDX, serving as source identifiers, and an item of master-slave-status information MSX.

The identifier IDX serves to identify the I/O ports IO1, IO2 and is sent from said ports as source identifier, for example with the designations "ID1", "ID2", to the clock generator modules GEN1, GEN2, for example in the frame of the clock signals TEX1, TEX2. In this way, by analysis of the clock signals TS1, TS2 it is possible for example to detect a wiring error in which the connections VG11, VG12, VG21 and/or VG22 have been incorrectly established due to cable mis-connections. The source identifier CUX is likewise assigned to the I/O ports IO1, IO2 and is inserted by the clock generator modules GEN1, GEN2 into the clock signals TS1, TS2 as an indication as to which of the I/O ports IO1, IO2 has been selected by them as source for the basic clock signal TEX1 and TEX2 respectively.

In the present case the clock generator modules GEN1, GEN2 synchronize one another, sending one another sychronization data SY serving as synchronization signals via a connection VSY. The transmitting and receiving means required for this purpose, for example corresponding integrated circuits, have not been shown for reasons of clarity. Inter alia, the clock generator modules GEN1, GEN2 negotiate as to which of the two modules operates as master clock generator module and which as slave clock generator module. Accordingly, the clock generator modules GEN1, GEN2 set the master-slave-status information MSX in the clock signals TS1, TS2 at the values "master" or "slave", for example at logic "1" or "0". In the present arrangement, the clock generator module GEN1, GEN2 operating as master clock generator module switches itself with priority to the I/O port IO1 or IO2 selected as source for the basic clock signal TEX1, TEX2, and the clock generator module GEN1, GEN2 operating as slave clock generator module in series therewith; the converse applies in the case of a change an the master-slave status. In principle however, the clock generator modules GEN1, GEN2 could also scan in parallel the I/O port IO1, IO2 selected as source for the basic clock signal TEX1, TEX2. Moreover, in addition to the I/O ports IO1, IO2, further I/O ports, optionally serving as clock signal source, could also be provided.

The clock generator module GEN1 sends the clock signals TS1, TS3 via connections VM11, VM31; VM12, VM32 to the receiver modules MOD1, MOD2, and the clock generator module GEN2 sends the clock signals TS2, TS4 via connections VM21, VM42; VM22, VM41 to the receiver modules MOD1, MOD2. The receiver module MOD1 receives the clock signals TS1 TS3; TS2, TS4 at inputs or ports P11 and P12 respectively which are assigned to receiving means (not shown) and which for example contain integrated circuits for data reception in accordance with the RS485 interface definition. Accordingly the receiver module MOD2 receives the clock signals TS1, TS3; TS2, TS4 via inputs or ports P21 and P22 respectively.

On the basis of the source identifier GENX, which is inserted by the clock generator modules GEN1, GEN2 into the clock signals TS1, TS2 and which unequivocally characterises the clock generator modules GEN1, GEN2, the receiver modules MOD1, MOD2 can detect whether the connections VM11, VM12 are correctly connected to their ports P11 and P21 respectively and the connections VM21, VM22 are correctly connected to their ports P12 and P22 respectively. In the event of incorrect wiring, the receiver modules MOD1, MOD2 emit error messages and for example activate an error display (not shown) or report the error to a control computer (not shown).

As a function of that clock signal TS1 or TS2 in which the master-slave-status information MSX is set at "master", the receiver modules MOD1, MOD2 select the clock signal TS1 or the clock signal TS2 as master synchronization signal and synchronize themselves therewith.

Figure 2:
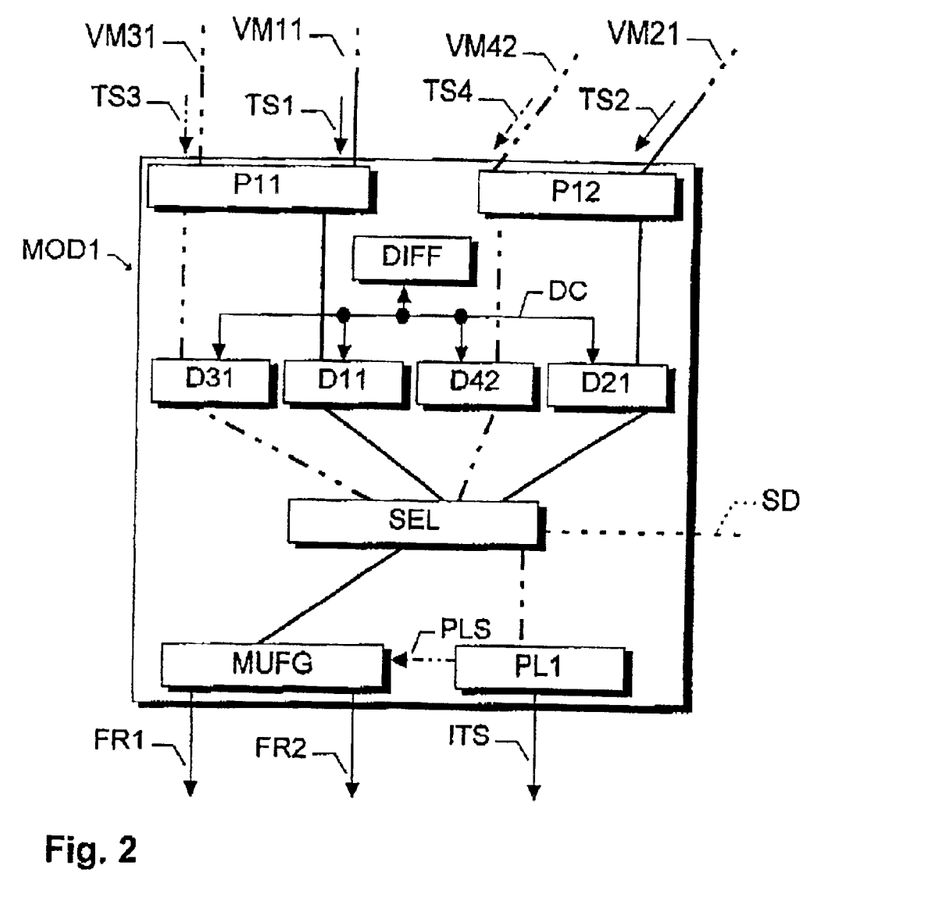
FIG. 2 is a schematic diagram of the receiver module MOD1.

FIG. 2 shows a schematic diagram of the receiver module MOD1. From a functional standpoint the receiver module MOD2 is of identical construction and therefore will not be described in detail. The illustrated components of the receiver module MOD1 can be constructed in the form of hardware, for example by means of one or more integrated circuits. For example the receiver module MOD1 can consist in whole or in part for example of a so-called field programmable gate array (FPGA) and/or can have the form of an application-specific integrated circuit (ASIC). The receiver module MOD1 can also be implemented as software in the form of a program module whose program code can be executed for example by a control processor of a switching matrix or by another processor arrangement.

In FIGS. 1 and 2 the signal flow of the clock signals TS1, TS2 in the receiver module MOD1 has been represented by continuous lines, and the signal flow of the clock signals TS3, TS4 by dash-dotted lines. From the ports P11 and P12 the clock signals TS3, TS1; TS4; TS2 are fed to delay means D31, D11; D42, D21 which are provided for the correction of phase differences which can occur between the clocks signals TS3, TS1 on the one hand and the clock signals TS4; TS2 on the other hand. The delay means D31, D11; D42, D21 are controlled and adjusted by a phase comparator DIFF via control lines DC.

From the delay means D31, D11; D42, D21 the clock signals TS3, TS1; TS4; TS2 are sent to a change-over switch SEL which is a selection means for selecting a clock signal TS1, TS2. For this purpose the change-over switch SEL and/or the ports P11, P12 serving as receiving means analyze for example the master-slave-status information MSX in the clock signals TS1, TS2. In the present case the change-over switch SEL switches over not only between the clock signals TS1 or TS2 but also between the clock signals TS3, TS4 which are assigned thereto and which serve for the fine synchronization.

The clock signals TS1, TS2 serve to synchronize a multiple frame generator MUFG which, from the clock signals TS1 or TS2, generates for example a frame FR1 with a frequency of 1 Hertz and a frame FR2 with a frequency of 8 Kilohertz. The clock signals TS3, TS4 serve for the fine synchronization of a local clock generator PL1, for example in the form of a so-called phase locked loop (PLL). The clock generator PL1 emits a high-frequency clock ITS, for example at 622 MHz, and additionally synchronizes the multiple frame generator MUFG with synchronization signal PLS. The fine synchronization with the additional clock signals TS3, TS4 constitutes an advantageous development of the invention.

Ideally, the frame clocks FR1, FR2 formed by the multiple frame generator MUFG are substantially synchronous with the respective selected clock signal TS1 or TS2. It is also possible for the frame clocks FR1, FR2 to be able to differ from the clock signals TS1, TS2 within predetermined tolerance limits. If such a tolerance limit is exceeded, the multiple frame generator MUFG automatically resynchronizes itself or receives an external reset- or resynchronization command given for example by the clock generator PL1.

In addition to the above described "in-band signalling" in the clock signals TS1, TS2, it is also possible for an item of master-slave-status information to be sent on a separate control channel, for example on the control channel SD shown in broken lines in FIG. 1, or in association with other control- or operating data intended for the receiver modules MOD1, MOD2. In this configuration the change-over switch SEL switches over between the clock signals TS1, TS2 and TS3, TS4 on the basis of an item of master-slave-status information sent via the control channel SD.

In the present arrangement it is provided that in normal operation only one of the clock generator modules GEN1, GEN2 sends a clock signal TS1, TS2 respectively serving as master synchronization signal and the other clock generator module sends only a clock signal TS1, TS2 serving as standby- or slave synchronization signal. If however a fault occurs, for example due to the failure of the connection VSY or one of the clock generator modules GEN1, GEN2, the synchronization data SY are no longer correctly received by the two clock generator modules GEN1, GEN2. In this case the clock generator module(s) GEN1, GEN2, which is/are operating in fault-free fashion, so to speak automatically assume the master mode and set the master-slave-status information MSX in the 1 clock signals TS1, TS2 at the values "master".

When, at their two respective ports P11, P12; P21, P22, the receiver modules MOD1, MOD2 receive the clock signals TS1, TS2 with an item of master-slave-status information set at "master", it can be predefined that they select the clock signal TS1 for example as master synchronization signal. It is also possible for the clock signal TS2 to be selected for example as master synchronization signal by the receiver modules MOD1, MOD2, even when the two clock signals TS1, TS2 are simultaneously set at "slave".

Phase differences can occur between the clock signals TS3, TS1; TS4; TS2, due for example to inadequate synchronization of the clock generator modules GEN1, GEN2 and/or due to different line lengths of the connections VM31, VM11 on the one hand and the connections VM21, VM42 on the other hand. The receiver modules MOD1, MOD2 correct such phase differences by the delay means D31, D11; D42, D21 and the phase comparator DIFF.

The delay means D31, D11; D42, D21 have the form for example of shift registers whose memory cells can be dynamically scanned via multiplexers. The memory cells which are to be scanned are set by the phase comparator DIFF in accordance with the respective phase differences between the clock signals TS3, TS1; TS4; TS2 so that the change-over switch SEL can at any time switch-over, without a phase jump, between the clock signals TS3, TS1; TS4; TS2 which are available at the output end in the delay means D31, D11; D42, D21 and which are appropriately delayed for the correction of input-end phase differences.

The delay means D11, D21 intended for the clock signals TS1, TS2 clocked with a comparatively low frequency are designed such that they can delay the clock signals TS1, TS2 by double the maximum expected propagation time difference, for example a suitable memory depth of the shift registers is provided. A correspondingly smaller delay capacity is sufficient in the case of the delay means D31, D42 intended for the clock signals TS3, TS4 clocked with a high frequency.

To simplify the drawing, only the process of phase matching of the clock signals TS1, TS2 will be described in the following. The delay means D11, D21 firstly delay each of the clocks signals TS1, TS2 by a basic delay which corresponds to a maximum expected propagation time difference or phase difference between the two signals. The propagation time difference can be determined for example on the basis of a maximum line length of cables used for the connections VM11, VM21. Then the phase comparator DIFF determines the phase difference between one of the clock signals TS1, TS2, for example the clock signal TS1 not selected as master synchronization signal, and the respective other clock signal TS2, TS1, for example the clock signal TS2, and in stepped fashion adapts the delay time of the delay means D21 assigned to this clock signal TS2, TS1 so that the phase difference is reduced. Here the delay means D11, D21, which for example each contain shift registers are scanned in stepped fashion at different memory locations which can be set by a multiplexer, the respective clock signal TS1, TS2 is determined and is reported again to the phase comparator DIFF.

It has proved advantageous for the adaptation of the delay time initially to take place with a large step rate in the case of large phase differences, for example if the clock signal TS1 substantially leads the clock signal TS2 and thus a rapidly reducing phase difference is achieved at the start. The step rate for the adaptation of the delay time is reduced in the case of only small phase differences, for example if the clock signal TS1 leads the clock signal TS2 only by a small amount.

Further variants of the invention are readily possible:

It will be obvious that the clock signals TS1, TS2 can also comprise further items of useful information, for example further quality identifiers and/or clock time and/or date information. In principle the clock signals TS1, TS2 could also be of simpler construction, for example could have the form of simple pulses in which an item of master-slave-status information is optionally contained.

Moreover further clock generator modules and/or receiver modules to be synchronized could also be provided in order to further increase the redundancy.

The clock generator modules GEN1, GEN2 on the one hand and the receiver modules MOD1, MOD2 on the other hand could be arranged in pairs in separate network devices located apart from one another, for example in SDH cross-connects or other computer systems. Additionally, for example on the one hand the clock generator module GEN1 and the receiver module MOD1, and on the other hand the clock generator module GEN2 and the receiver module MOD2 could also be arranged in pairs in separate network devices located apart from one another.

Furthermore the clock generator modules GEN1, GEN2 could also comprise clock generator means which each operate autonomously, for example oscillators, and synchronize one another via the connection VSY. The external clock signals TEX1, TEX2 then would not be essential.

In another configuration the receiver modules MOD1, MOD2 could be directly supplied with the external clock signals TEX1, TEX2 which then for example would contain an item of master-slave-status information or in addition to which an item of master-slave-status information would be sent to the receiver modules MOD21, MOD2 so that the clock generator modules GEN1, GEN2 are not required.

Additionally, one of the clock generator modules GEN1, GEN2 could be predefined so-to-speak as default master clock generator module and one as slave clock generator module, the latter synchronizing itself with the master clock generator module and, upon the failure thereof, so-to-speak automatically becoming the master clock generator module for the network device NWE.

Combinations of clock generator modules and receiver modules could also be formed. For example, the clock generator module GEN1 and the receiver module MOD1, and likewise the clock generator module GEN2 and the receiver module MOD2, could be combined to form a combination module of this kind and for example reciprocally synchronize one another.

It will be clear that arbitrary combinations of the measures and arrangements described in the claims and in the description are also possible.

What is claimed is:

1. A method of synchronizing an output signal of at least one receiver module with at least one external clock signal comprising:

sending at least a first clock signal and a second clock signal to the at least one receiver module:

sending at least one item of master-slave status information about at least one of the first clock signal and the second clock signal to the at least one receiver module; and selecting, as a function of the item of master-slave status information, at the at least one receiver module, the first clock signal or the second clock signal as a master synchronization signal for the synchronization of the output signal of the at least one receiver module with the at least one external clock signal.

2. A method according to claim 1, wherein the first clock signal or the second clock signal is defined as a preferred master synchronization signal, and wherein the at least one receiver module selects as the master synchronization signal the first clock signal or the second clock signal which is defined as the preferred master synchronization signal when the first clock signal or the second clock signal, to be selected as the master synchronization signal, cannot be detected on the basis of the at least one item of master-slave status information.

3. A method according to claim 1, wherein the first clock signal is generated by a first clock generator module and the second clock signal is generated by a second clock generator module, wherein at least the first clock generator module sends the second clock generator module a synchronization signal, provided for the synchronization of an output signal of the second clock generator module with an output signal of the first clock generator module, and wherein the at least one item of master-slave status information defines the first clock signal as the master synchronization signal for such time as the second clock generator module receives the synchronization signal.

4. A method according to claim 3, wherein the at least one item of master-slave status information defines the first clock signal and the second clock signal as master synchronization signals when the second clock generator module does not receive the synchronization signal.

5. A method according to claim 1, wherein the at least one item of master-slave status information is contained at least partially in at least one of the first clock signal and the second clock signal.

6. A method according to claim 1, wherein the first clock signal is sent on a first clock line, and the second clock signal is sent on a second clock line, to the at least one receiver module.

7. A method according to claim 1, wherein least one of the first clock signal, the second clock signal, and an item of control information assigned to the first clock signal or the second clock signal, contains at least one item of source information from which the at least one receiver module can determine the source from which the first clock signal and the second clock signal emanates.

8. A method according to claim 1, wherein the at least one receiver module is sent at least a third clock signal provided for fine synchronization, and wherein the at least one receiver module synchronizes at least one of the output signals of the receiver module both with the first clock signal or the second clock signal selected as the master synchronization signal, and also with the at least third clock signal.

9. A method according to claim 1, wherein the method is performed in a transmission network, or in a network device of a transmission network.

10. A method according to claim 1, further comprising:

the at least one receiver module delaying first clock signal with a first delay means by a predetermined first delay time;

the at least one receiver module delaying the second clock signal with a second delay means;

the at least one receiver module determining a phase difference between the first clock signal and the second clock signal; and the at least one receiver module adapting the phase of the second clock signal to the phase of the first clock signal by adjusting the second delay means so that the at least one receiver module can extract the first clock signal and the second clock signal in-phase from the first delay means and from the second delay means respectively.

11. A receiver module with a synchronizable output signal, comprising:

a receiving means for receiving at least a first clock signal and a second clock signal, wherein the receiving means is designed to receive at least one item of master-slave status, information about at least one of the first clock signal and the second clock signal: and a selection means for selecting the first clock signal or the second clock signal as a master synchronization signal for the synchronization of the output signal of the receiver module with an external clock signal, wherein the selection means is designed such that, as a function of the item of master-slave status information, the receiver module can select the first clock signal or the second clock signal as the master synchronization signal for the synchronization of the receiver module with the external clock signal.

12. A clock generator module for synchronizing an output signal of at least one receiver module with an external clock signal comprising:

a clock generation means for generating at least a first clock signal;

a transmitting means for transmitting the first clock signal to the at least one receiver module, wherein the transmitting means is designed to transmit at least one item of master-slave status information about the first clock signal; and a selection means wherein the at least one receiver module selects, as a function of the master-slave status information, the first clock signal or a second clock signal as a master synchronization signal for the synchronization of the output signal of the receiver module with the external clock signal.

13. A clock generator module according to claim 12, wherein the transmitting means designed to transmit a synchronization signal which is provided for the synchronization of a second clock generator module, and/or wherein the first clock generator module comprises a receiving means for receiving a synchronization signal from the second clock generator module, provided for the synchronization of at least one output signal of the first clock generator module, with at least one output signal of the second clock generator module, and wherein the transmitting means is designed such that, on the basis of the at least one item of master-slave status information the transmitting means defines the first clock signal as the master synchronization signal for such time as the first clock generator module receives the synchronization signal.

14. A receiver module according to claim 11, comprising a program code which can be executed by a control means of a network device, by a control means on a console of a network device for a transmission network with a synchronous digital hierarchy.

15. A clock generator module according to claim 12, comprising a program code which can be executed by a control means of a network device, by a control means on a console of a network device for a transmission network with a synchronous digital hierarchy.

16. A storage medium storing a receiver module according to claim 14.

17. A network device for a transmission network with a synchronous digital hierarchy, with at least one receiver module according to claim 11.

18. A storage medium storing a clock generator module according to claim 15.

19. A network device for a transmission network with a synchronous digital hierarchy, with at least one clock generator module according to claim 12.

20. A method according to claim 1, wherein the at least one receiver module is in a telecommunications network or a network device of a telecommunications network.

21. A method according to claim 2, wherein the first clock signal or the second clock signal, to be selected as the master synchronization signal, cannot be detected on the basis of the at least one item of master-slave status information because the item of master-slave status information is not sent, or is faultily sent, to the at least one receiver module.

22. A method according to claim 2, wherein the first clock signal or the second clock signal, to be selected as the master synchronization signal, cannot be detected on the basis of the at least one item of master-slave status information because the item of master-slave status information identifies both the first clock signal and the second clock signal as the master synchronization signal.

23. A method according to claim 7, wherein the first clock generator module and the second clock generator module add the respective items of source information, by which they are identified, to the first clock signal and the second clock signal, respectively.

24. A method according to claim 9, wherein the method is performed in a transmission network with a synchronous digital hierarchy.

25. A method according to claim 10, wherein the predetermined first delay time corresponds to a maximum expected propagation time difference between the first clock signal and the second clock signal.

26. A method according to claim 11, wherein the at least one receiver module is in a telecommunications network or in a network device of a telecommunications network.

27. A method according to claim 12, wherein the at least one receiver module is in a telecommunications network or in a network device of a telecommunications network.

28. A method of internal redundant clock distribution to synchronize an output signal of at least one receiver module with at least one external clock signal, comprising:
- the at least one receiver module receiving at least one external clock signal;
- distributing the external clock signal to at least a first independent clock signal generator module and a second independent clock signal generator module;
- transmitting at least one item of master-slave status information about the first independent clock signal generator module and the second independent clock signal generator module to the at least one receiver module;
- regenerating the external clock signal by the first independent clock signal generator module and the second independent clock signal generator module;
- transmitting the clock signals regenerated by the first independent clock signal generator module and the second independent clock signal generator module to the at least one receiver module;
- selecting, as a function of the item of master-slave status information, at least one of the regenerated clock signals from the first independent clock signal generator module and the second independent clock signal generator module to serve as a master synchronization signal for the synchronization of the output signal of the at least one receiver module with the at least one external clock signal;
- synchronizing the output signal of the at least one receiver module with the at least one regenerated clock signal selected as the master synchronization signal.

29. A method according to claim 28, wherein the at least one receiver module is in a telecommunications network or a network device of a telecommunications network.

30. A method according to claim 28, wherein the clock signal regenerated by the first independent clock signal generator module or the clock signal regenerated by the second independent clock signal generator module is defined as a preferred master synchronization signal, and wherein the at least one receiver module selects as the master synchronization signal the clock signal which is defined as the preferred master synchronization signal when the clock signal regenerated by the first independent clock signal generator module or the clock signal regenerated by the second independent clock signal generator module, to be selected as the master synchronization signal, cannot be detected on the basis of the at least one item of master-slave status information.

31. A method according to claim 30, wherein the clock signal regenerated by the first independent clock signal generator module or the clock signal regenerated by the second independent clock signal generator module, to be selected as the master synchronization signal, cannot be detected on the basis of the at least one item of master-slave status information because the item of master-slave status information is not sent, or is faultily sent, to the at least one receiver module.

32. A method according to claim 30, wherein the clock signal regenerated by the first independent clock signal generator module or the clock signal regenerated by the second independent clock signal generator module, to be selected as the master synchronization signal, cannot be detected on the basis of the at least one item of master-slave status information because the item of master-slave status information identifies both the clock signal regenerated by the at least first independent clock signal generator module and the clock signal regenerated by the second independent clock signal generator module as the master.synchronization signal.

33. A method according to claim 28 further comprising:
- the first independent clock signal generator module sending the second independent clock signal generator module a synchronization signal, provided for the synchronization of the output signal of the second independent clock signal generator module with the output signal of the first clock generator module, wherein the at least one item of master-slave status information defines the clock signal regenerated by the first independent clock signal generator module as the master synchronization signal for such time as the second independent clock signal generator module receives the synchronization signal.

34. A method according to claim 33, wherein the at least one item of master-slave status information defines the clock signal regenerated by the first independent clock signal generator module and the clock signal regenerated by the second independent clock signal generator module as master synchronization signals when the second independent clock generator module does not receive the synchronization signal.

35. A method according to claim 28, wherein the at least one item of master-slave status information is contained at least partially in at least one of the clock signal regenerated by the first independent clock signal generator module and the clock signal regenerated by the second independent clock signal generator module.

36. A method according to claim 28, wherein the clock signal regenerated by the first independent clock signal generator module is sent on a first clock line, and the clock signal regenerated by the second independent clock signal generator module is sent on a second clock line, to the at least one receiver module.

37. A method according to claim 28, wherein at least one of the clock signal regenerated by the first independent clock signal generator module, the clock signal regenerated by the second independent clock signal generator module, and an item of control information assigned to the clock signal regenerated by the first independent clock signal generator module or the clock signal regenerated by the second independent clock signal generator module, contains at least one item of source information from which the at least one receiver module can determine the source from which the clock signal regenerated by the first independent clock signal generator module and the clock signal regenerated by the second independent clock signal generator module emanates.

38. A method according to claim 28, wherein the at least one receiver module is sent at least a third clock signal provided for fine synchronization, and wherein the at least one receiver module synchronizes at least one of its output signals both with the clock signal regenerated by the first independent clock signal generator module or the clock signal regenerated by the second independent clock signal generator module selected as the master synchronization signal, and also with the at least third clock signal.

39. A method according to claim 28, wherein the method is performed in a transmission network, or in a network device of a transmission network.

40. A method according to claim 39, wherein the method is performed in a transmission network with a synchronous digital hierarchy.

41. A method according to claim 28, further comprising:
the at least one receiver module delaying the clock signal regenerated by the first independent clock signal generator module with a first delay means by a predetermined first delay time;
the at least one receiver module delaying the clock signal regenerated by the second independent clock signal generator module with a second delay means;
the at least one receiver module determining a phase difference between the clock signal regenerated by the first independent clock signal generator module and the clock signal regenerated by the second independent clock signal generator module; and
the at least one receiver module adapting the phase of the clock signal regenerated by the second independent clock signal generator module to the phase of the clock signal regenerated by first independent clock signal generator module by adjusting the second delay means so that the at least one receiver module can extract the clock signal regenerated by the first independent clock signal generator module and the clock signal regenerated by the second independent clock signal generator module in-phase from the first delay means and from the second delay means respectively.

42. A method according to claim 41, wherein the predetermined first delay time corresponds to a maximum expected propagation time difference between the clock signal regenerated by the first independent clock signal generator module and the clock signal regenerated by the second independent clock signal generator module.

* * * * *